United States Patent [19]

Dong et al.

[11] Patent Number: 4,872,957
[45] Date of Patent: Oct. 10, 1989

[54] ELECTROCHEMICAL CELL HAVING DUAL PURPOSE ELECTRODE

[75] Inventors: Dennis F. Dong; Edward B. Noonan; Derek J. Rogers, all of Kingston; Arthur L. Clifford, Markham; Katharina Benesch, Kingston, all of Canada; Richard E. Loftfield, Jacksonville, Fla.

[73] Assignee: H-D Tech Inc., Woodbridge

[21] Appl. No.: 221,854

[22] Filed: Jul. 20, 1988

[51] Int. Cl.⁴ .................. C25B 1/30; C25B 11/03
[52] U.S. Cl. .................................. 204/84; 204/98; 204/128; 204/280; 204/283; 204/252; 204/294
[58] Field of Search .............. 204/280, 282, 283, 252, 204/59 R, 84, 98, 128, 292

[56] References Cited

U.S. PATENT DOCUMENTS

| | | | |
|---|---|---|---|
| 3,827,964 | 8/1974 | Okubo et al. | 204/252 |
| 3,969,201 | 7/1976 | Oloman et al. | 204/83 |
| 4,118,305 | 10/1978 | Oloman et al. | 204/83 |
| 4,445,986 | 5/1984 | McIntyre et al. | 204/98 |
| 4,457,953 | 7/1987 | McIntyre et al. | 427/113 |
| 4,511,441 | 4/1985 | McIntyre et al. | 204/98 |

Primary Examiner—John F. Niebling
Assistant Examiner—Kathryn Gorgos
Attorney, Agent, or Firm—Andrew E. Pierce

[57] ABSTRACT

Cell having a porous, self-draining, gas diffusion electrode contained within a frame and having on both sides of said electrode a liquid permeable microporous diaphragm. The electrode assembly contains an internally positioned current distributor. The cell has two oppositely charged electrodes separated by the electrode assembly which divides a single electrolyte compartment. In operation, electrolyte is flowed into the electrolyte compartment and spent electrolyte is removed. In one embodiment of the invention, the electrolyte is internally circulated by turbulent flow of electrolyte as the result of the upward movement of gas released at an electrode.

18 Claims, 2 Drawing Sheets

ELECTROCHEMICAL CELL HAVING DUAL PURPOSE ELECTRODE

BACKGROUND OF THE INVENTION (1) Field of the Invention

This invention relates to an electrochemical cell for reacting a liquid with a gas.

(2) Description of the Prior Art

Packed bed chlor-alkali electrolytic cells are known from Oloman et al U.S. Pat. No. 3,969,201 and U.S. Pat. No. 4,118,305. Improvements in these cells hve been disclosed by McIntyre et al in U.S. Pat. No. 4,406,758; U.S. Pat. No. 4,431,494; U.S. Pat. No. 4,445,986; U.S. Pat. No. 4,511,441; and U.S. Pat. No. 4,457,953. These packed bed electrolytic cells are particularly useful for the production of alkaline solutions of hydrogen peroxide.

Among known bleaching agents, hydrogen peroxide is at the present time being increasingly used, in particular for bleaching materials such as textiles or paper pulp. Hydrogen peroxide has the great advantage over other bleaching agents, in particular chlorine and its compounds, in that because of its mild action, it attacks the fibers of the material to be treated to a much lesser extent and gives a better finish.

Hydrogen peroxide is generally used in bleaching in the form of a stabilized alkaline solution of low peroxide concentration. The action of hydrogen peroxide in bleaching consists essentially of destroying or decolorising the natural dyes by oxidation, or by rendering them soluble. Even though the mechanism of these reactions has not been extensively studied, it is generally assumed that the hydrogen peroxide ion $HOO^-$ is responsible for the bleaching.

Present-day bleaching solutions based on hydrogen peroxide have the great disadvantage with respect to other conventional bleaching solutions (in particular hypochlorite-based solutions) of being relatively costly. Their widespread use is very dependent upon economic considerations, particularly when large quantities of low-value material such as paper pulp are to be treated. Present-day bleaching solutions are nearly always prepared by simple dissolving and dilution, starting from commercially available chemicals. Commercially available hydrogen peroxide is a particularly costly substance, as it is manufactured only in a small number of large industrial plants, and it has therefore to be highly concentrated for storage and transport purposes before being distributed. At the present time there is a need to replace the highly concentrated, commercially available hydrogen peroxide by on site manufacturing methods which enable dilute solutions of hydrogen peroxide to be produced directly, in order to reduce bleaching costs. However, up to the present time no satisfactory method has appeared.

Hydrogen peroxide is used not only for bleaching purposes, but also in an increasing number of other processes, in particular in the pollution control field. However, treatment solutions used for this purpose are likewise almost always prepared from highly concentrated hydrogen peroxide with the same disadvantages as heretofore stated.

In Grangaard, U.S. Pat. No. 3,607,687; U.S. Pat. No. 3,462,351; U.S. Pat. No. 3,507,769; and U.S. Pat. No. 3,592,749, there are disclosed electrolytic cells for the production of hydrogen peroxide in which the peroxide is produced in the cathode compartment of the cell which contains a cathode depolarized utilizing an oxygen containing gas. The electrochemical cells of Oloman et al and McIntyre et al disclosed in the patents cited above, are improvements over the cells of Grangaard partly as the result of the use of the novel electrode material disclosed in U.S. Pat. No. 4,457,953 in which there is disclosed a method for the production of coated particles for use in a packed bed electrode electrochemical cell.

SUMMARY OF THE INVENTION

An electrochemical cell is disclosed for reacting a liquid with a gas, said cell having at least one dual purpose (electrolyte-active on both sides) gas diffusion electrode assembly comprising a porous, self-draining, gas diffusion electrode containing an internally positioned current distributor, all contained in a frame, and contacting the external, largest area faces of said electrode is a liquid permeable, microporous diaphragm.

The gas diffusion electrode is preferably a cathode and is useful in an electrochemical cell unit in combination with two electrodes having opposite charge, preferably anodes, which can be metal sheets. These electrodes (anodes) are positioned on either side of said gas diffusion electrode assembly in the same electrolyte compartment. Electrolyte is flowed into said cell by means comprising pumping. In a preferred embodiment, electrolyte is also internally circulated within said compartment by the turbulent flow of electrolyte resulting from the upward movement of gas released at said electrodes of opposite charge during operation of the cell.

A feature of one embodiment of the electrochemical cell of the invention is the controlled flow of electrolyte through a plural layered diaphragm so that "starvation" of the electrode does not occur (at the top) and "flooding" of the electrode does not occur (at the bottom). By "controlled flow" is meant a reduction in the variation of the flow rate from top to bottom of the diaphragm over a wide range of electrolyte head levels.

DETAILED DESCRIPTION OF THE INVENTION AND THE PREFERRED EMBODIMENTS

It has been found, as disclosed in U.S. patent applications Ser. No. 870,474, filed June 4, 1986 and Ser. No. 777,483, filed Sept. 19, 1985, both incorporated herein by reference, that a packed bed, self-draining cathode for maximum effectiveness in an electrochemical cell for the production of an alkaline hydrogen peroxide solution must be uniformly supplied with a liquid anolyte. Preferably, electrolyte flow through a porous diaphragm occurs at a substantially uniform rate without appreciable variation as a function of the head of the electrolyte. Porous diaphragms for packed bed electrolytic cells, as disclosed in the prior art have permitted a considerable variation in flow rate dependent upon the electrolyte head level to which the diaphragm is exposed. Thus, the flow rate at the base of the cell (exposed to the full head of the electrolyte) is appreciably faster than the flow rate in the center of the cell or at the top of the cell, where a decreased head pressure is exerted on the diaphragm. This variation in flow rate has resulted in inefficiency of the cell. A less than optimal amount of electrolyte passing through the porous diaphragm into the cathode results in an increase in cell voltage. A more than optimal amount of electrolyte passing through the porous diaphragm causes flooding of the packed bed cathode and consequent reduction in effectiveness of the depolarizing gas.

Figure 1:
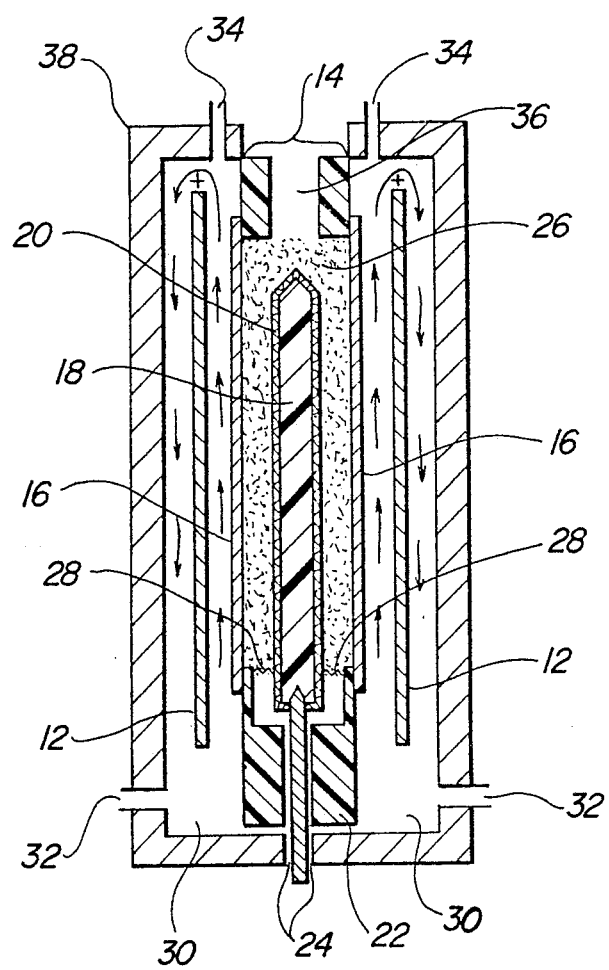
FIG. 1 is a diagramatic drawing of one embodiment of the invention showing an apparatus for producing alkaline hydrogen peroxide utilizing a monopolar electrolytic cell unit having an anolyte, a dual purpose, gas diffusion electrode assembly, two anodes and at least one inlet and outlet for circulation of anolyte.

One embodiment of the invention, as illustrated in FIG. 1, is an apparatus for producing alkaline hydrogen peroxide by electrolyzing a sodium hydroxide solution. The apparatus generally includes cell casing 38 having anolyte inlets 32 and outlets 34 and forming an anolyte compartment 30; anodes 12; an electrode frame 22 and a porous, self-draining gas diffusion cathode assembly 14, including multiple layered microporous diaphragms 16, an internally positioned current distributor 20, and a plastic core 18. The cathode assembly is contained in a plastic frame 22 which is removably positioned within said cell casing 38. Provision is made for removal of the product produced at the cathode through product outlets 24. Preferably the porous, gas diffusion electrode comprises carbon chips 26 at the base of which are located sump screens 28. Within the anolyte compartment 30 anolyte is recirculated through inlets 32 and spent anolyte is removed through outlets 34. Within the anolyte compartment 30 there is preferably maintained an internal circulation of anolyte in an upward direction between anode 12 and diaphragm 16 and a downward direction on the opposite side of said anode 12. The apparatus is supplied with an external power supply which is not shown. An oxygen containing gas enters the dual purpose electrode assembly 14 at gas inlet 36. Electrical connection is made through the cathode frame 22 to the electrode 14.

Figure 2:
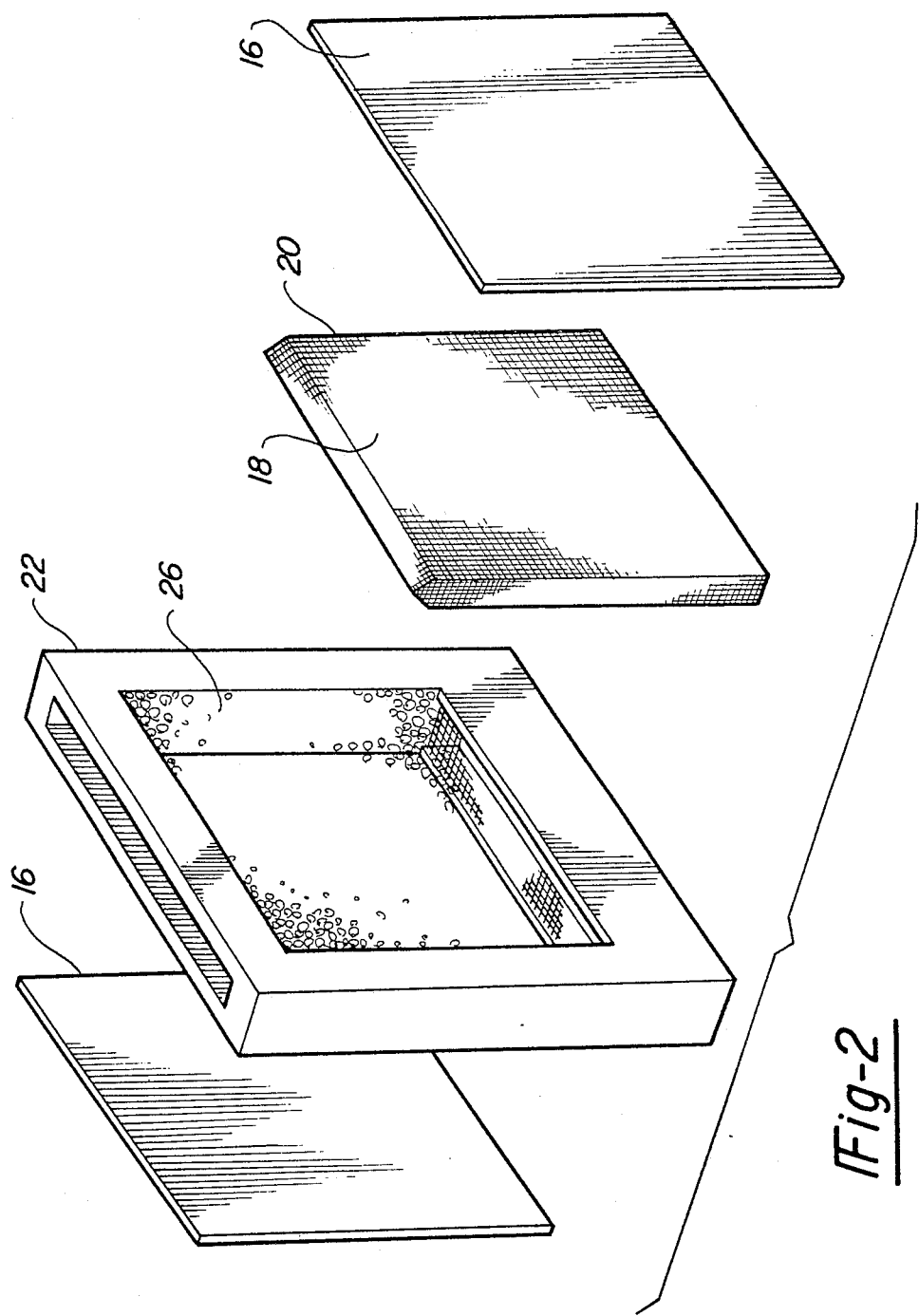
FIG. 2 is an exploded view of a dual purpose electrode assembly showing a frame, a liquid permeable diaphragm positioned on both sides of said frame, and a porous, self-draining gas diffusion electrode having an internally positioned current distributor.

In FIG. 2 which provides an exploded view of one embodiment of the dual purpose electrode assembly of the invention, there is shown a frame 22 and multiple layered diaphragm 16 contacting the porous, self-draining gas diffusion electrode particles 26. A current distributor composed of a supporting plastic core 18 faced with a nickel mesh 20 provides current to electrode 14. The electrode assembly is dual purpose in being capable of activity on both sides of the electrode surface exposed to electrolyte.

In operation, as shown in FIG. 1, the aqueous alkaline anolyte passes in bulk flow through the multiple layers of the diaphragm 16 into the porous, packed bed cathode particles 26. The liquid electrolyte flow across the diaphragm 16 is relatively uniform as the result of the use of multiple layers of diaphragm material. The porous, self-draining cathode particles 26 are electrically conductive and are in contact with an internally positioned metal mesh current distributor 20 which is supported by a plastic core 18. During operation, the electrolytic cell is fed with an oxygen containing gas through inlet 36 and a sodium hydroxide aqueous solution anolyte is fed into anolyte inlet 32 and removed through anolyte outlet 34. An aqueous, alkaline, hydrogen peroxide product of electrolysis is removed through product outlets 24 at the base of said porous, self-draining cathode frame 22.

A novel feature of the electrochemical cell of the invention is the dual purpose gas depolarized electrode assembly 14. Preferably, the electrode assembly functions as a cathode in an electrolytic cell for the production of alkaline hydrogen peroxide or in an electrolytic cell for the production of a halogen gas and an alkali metal hydroxide. Combination of said dual purpose electrode assembly with two anodes contained in an anolyte compartment separated by said electrode assembly provides a novel cell design. Said cell can also be operated so as to provide internal circulation of anolyte to increase the flow of anolyte between the active surface of the anode and the cell diaphragm. This internal anolyte circulation is driven by the turbulent upward movement of gas bubbles formed on the anode, thus carrying the liquid anolyte upward on the active face of the anode.

The cell design shown in FIG. 1 and FIG. 2 is also suited to the electrolysis of an alkali metal halide to produce a halogen and an alkali metal hydroxide solution. When an electrolytic cell designed in accordance with the invention is utilized for the production of chlorine and an alkali metal hydroxide, an aqueous solution of an alkali metal halide is utilized as anolyte and halogen is produced at the anode. Hydrogen, which would normally be produced at the cathode is not produced when an oxygen containing depolarizing gas is fed to the porous packed bed cathode, thus effecting a saving in cell voltage.

In one embodiment of the electrochemical cell of the invention, the cell design can provide for the control over the height of the individual units of a bipolar electrolytic cell by the use of frame components which can accommodate multiple cells stacked vertically thus forming an integral unit. The units can be stacked both vertically and in the usual horizontal direction which is characteristic of prior art filter press type electrochemical cells. Alternatively, individual cell units can be stacked only vertically.

In the production of chlorine and caustic or in the production of an alkaline aqueous solution of hydrogen peroxide by electrolysis, a porous, self-draining cathode is simultaneously supplied with an oxygen containing gas and an aqueous liquid. The diaphragm comprises plural layers, for example, multiple or variable layers of (1) the same microporous polyolefin film alone or (2) multiple or variable layers of said film laminated to a support fabric resistant to degradation upon exposure to electrolyte.

In the following description, an electrochemical reaction for the production of an alkaline hydrogen peroxide solution is described as a representative electrochemical process utilizing one embodiment of the electrolytic cell of the invention. The process is conducted by electrolyzing an aqueous electrolyte comprising an alkali metal hydroxide flowed into the electrolyte compartment of said cell. Spent electrolyte is recovered from said electrolyte compartment. The electrolytic cell has a single anolyte compartment containing two anodes separated by a dual purpose gas diffusion cathode assembly. The cathode assembly has plural layered, liquid permeable diaphragms contacting the external largest faces of a porous, packed bed cathode having an internally positioned current distributor. An aqueous solution of hydrogen peroxide and an alkali metal hydroxide is recovered as the product of electrolysis from the base of the monopolar cathode. An oxygen containing gas, such as air, is flowed simultaneously with a controllably flowed anolyte from the anolyte compartment of the cell into the self-draining cathode through a plural layered, microporous film diaphragm at a flow rate about equal to the drainage rate of said cathode. The flow rate through said diaphragm is partially determined by the differential pressures on said diaphragm. On the cathode side of the diaphragm, the pressure may be at atmospheric pressure or different from atmospheric pressure as the result of causing a gas to flow under pressure into the packed bed, self-draining cathode. The cathode can comprise a packed bed of loose, conductive particles such as graphite. The pressure on the anolyte side of the diaphragm can be adjusted by changing the height of the head of electrolyte in the anolyte compartment. The head of the anolyte is specified in this specification and claims as measured from the top of the diaphragm to the top surface of the anolyte liquid. This pressure may be augmented by gas pressure. Thus the effective pressure which causes the flow of anolyte through the cell diaphragm is the head pressure of the anolyte minus the pressure on the gas diffusion cathode side of said diaphragm.

The porous, self-draining cathode generally has a thickness of about 0.03 inch to about 1 inch in the direction of current flow. The cathode bed can comprise a fixed bed (sintered) porous matrix as well as a bed of loose particles, said electrode having pores formed between said particles of sufficient size and number to allow both gas and liquid to flow therethrough. The cathode generally contains a conductive material which may also be a good electrocatalyst for the reaction to be carried out. In the reduction of oxygen to hydrogen peroxide, graphite particles coated with carbon and polytetrafluoroethylene as a binder have been found to be suitable for forming the cathode mass because the graphite substrate is cheap and conductive. For other reactions, uncoated graphite or other forms of carbon or tungsten carbide substrates can be used as well as certain metals such as platinum, iridium, or metal oxides such as lead dioxide or manganese dioxide coated on a conducting or nonconducting substrate. The graphite particles typically have diameters in the range of about 0.005 to about 0.5 centimeters and the pores formed between the packed particles have a minimum diameter of about 30 to about 50 microns.

Generally, the packed bed, self-draining cathode is supplied with current through a cathode contacting current distributor (collector) which can be a metal mesh or a metal sheet, generally made of any electrically conductive metal, but preferably stainless steel or nickel. The current distributor is uniquely positioned internally within the cathode packed bed. Generally the current distributor can be a single metal mesh but is preferably composed of two sheets of metal mesh alone or supported by a plastic sheet core. By placing the current distributor internally instead of on the electrode active face of the cathode between the packed bed and the porous diaphragm, improved flow into the cathode is obtained. In addition, the electrolyte wicking tendency, shown when the current distributor is on the electrolyte active face of the cathode, is avoided.

The plural layered cell diaphragm preferably comprises multiple layers of (1) the same microporous polyolefin film diaphragm material or (2) the same composite comprising an electrolyte resistant support fabric and said microporous polyolefin film. The term "plural layers" in this specification and claims is defined as including variable layers as well as uniform multiple layers. The support fabric can be laminated to said film and can be a woven or non-woven fabric selected from the group consisting of asbestos, polyolefins, fluorinated polyolefins, polyamides, polyesters and mixtures thereof. Preferably said support fabric is a woven or non-woven fabric derived from a polymer selected from the group consisting of polyethylene, polypropylene, polytetrafluoroethylene, fluorinated ethylene propylene, polychlorotrifluoroethylene, polyvinyl fluoride, polyvinylidene fluoride, and mixtures thereof. For use in the preparation of an aqueous, alkaline solution of hydrogen peroxide, a polypropylene woven or non-woven fabric support layer is preferred for use in the formation of the composite diaphragm of the invention. Alternatively, there can be used any other polyolefin, fluorinated polyolefin, polyamide, or polyester fabric or mixtures thereof and each of these materials can be used in combination with asbestos in the preparation of the supporting fabric. No necessity exits for holding together the multiple layers of the diaphragm such as by bonding the layers. At the peripheral portions thereof or otherwise, the diaphragm is fastened to the frame members of the electrolytic cell. Multiple diaphragm layers of two to about five layers of said microporous film or composite have been found useful in reducing the variation in flow of electrolyte through the cell diaphragm over the usual and practical range (0.5 foot to about 10 feet) of electrolyte head. Portions of the multiple layered diaphragm which are exposed to the full head of electrolyte, as compared with portions of the cell diaphragm which are exposed to little or no electrolyte head, pass substantially the same amount of electrolyte to the cathode.

As an alternative but less preferred means of producing a useful plural layered diaphragm, it has been found desirable to prepare a cell diaphragm having variable layers of the same defined microporous film or composite diaphragm material. Thus it is suitable to utilize one to about two layers ot the defined microporous film or composite material in areas of the cell diaphragm which are expoed to relatively low pressure as the result of being positioned close to the top surface of the body of electrolyte while utilizing about two to about six layers of the defined film or composite porous material in the areas of the diaphragm which are exposed to moderate or high electrolyte pressure. A preferred construction is two layers of the defined film or composite porous material on the top portion of the diaphragm and three layers of said composite on the bottom portion of said diaphragm.

The microporous polyolefin film or composite diaphragm is characterized as hydrophilic, having been treated with a wetting agent in the preparation thereof. In a 1 mil thickness, the film portion of the composite has a porosity of about 38% to about 45%, and an effective pore size of about 0.02 to about 0.04 micrometers. A typical composite diaphragm consists of a 1 mil thick microporous polyolefin film laminated to a non-woven polypropylene fabric with a total thickness of about 5 mils. Such porous material composites are available under the trade designation CELGARD ® from Celanese Corporation. Utilizing about 2 to about 4 multiple layers of the above described porous composite material as an electrolytic cell diaphragm, it is possible to obtain a flow rate within an electrolytic cell of about 0.01 to about 0.50 milliliters per minute per square inch of diaphragm, generally over a range of electrolyte head of about 0.5 foot to about 10 feet, preferably about 1 to about 4 feet. Preferably said flow rate over said range of electrolyte head, is about 0.03 to about 0.3 and most preferably is about 0.05 to about 0.1 milliliters per minute per square inch of diaphragm. Cells operating at above atmospheric pressure on the cathode side of the diaphragm would have reduced flow rates at the same anolyte head levels since it is the differential pressure that is responsible for electrolyte flow across the diaphragm.

Prior art patents U.S. Pat. No. 4,118,305; U.S. Pat. No. 3,969,201; U.S. Pat. No. 4,445,986; and U.S. Pat. No. 4,457,953 are hereby incorporated by reference. Self-draining, packed bed electrodes disclosed in these patents are typically composed of graphite particles; however other forms of carbon can be used as well as certain metals. The packed bed cathode typically has a plurality of interconnecting passageways (formed between the particles) having average diameters sufficiently large so as to make the cathodes self-draining, that is, the effects of gravity are greater than the effects of capillary pressure on an electrolyte present within the passageways. The diameter actually required depends upon the surface tension, the viscosity, and other physical characteristics of the electrolyte present within the packed bed electrode. Generally the passageways have a minimum diameter of about 30 to about 50 microns, but the maximum diameter is not critical. The self-draining cathode should not be so thick as to unduly increase the resistance losses of the cell. A suitable thickness for a packed bed cathode hs been found to be about 0.03 inch to about 1 inch, preferably about 0.06 inch to about 0.5 inch. Generally the packed bed cathode is electrically conductive and prepared from such materials as graphite, steel, iron, and nickel. Glass, various plastics and various ceramics can be used in admixture with conductive materials. The individual particles can be unsupported or the particles can be sintered or otherwise bonded together but none of these alternatives is necessary for the satisfactory operation of a useful packed bed cathode.

An improved material useful in the formation of the packed bed cathode is disclosed in U.S. Pat. No. 4,457,953 comprising a particulate substrate which is at least partially coated with an admixture of a binder and an electrochemically active, electrically conductive catalyst. Typically the substrate is formed of an electrically conductive or nonconductive material having a particle size smaller than about 0.3 millimeter to about 2.5 centimeters or more. The substrate need not be inert to the electrolyte or to the products of the electrolysis process in which the particle is used but is preferably chemically inert since the coating which is applied to the particle substrate need not totally cover the substrate particles for the purpose of rendering the particle useful as a component of a packed bed cathode. Typically the coating on the particle substrate is a mixture of a binder and an electrochemically active, electrically conductive catalyst. Various examples of binder and catalyst are also disclosed in U.S. Pat. No. 4,457,953.

Stabilizing agents suitable for addition to the electrolyte of an electrolytic cell for the production of hydrogen peroxide are disclosed in U.S. Pat. No. 4,431,494, incorporated herein by reference. Such stabilizing agents include compounds that form chelates with impurities found to be catalysts for the decomposition of the hydrogen peroxide produced within the cell. Specific stabilizing agents include alkali metal salts of ethylenediaminetetraacetic acid, stannates, phosphates, alkali metal silicates, and 8-hydroxyquinoline.

In an electrolytic cell where aqueous sodium or potassium hydroxide is desired as a product, generally a brine or potassium chloride is fed to the anolyte compartment of the electrolytic cell so as to maintain a pH of about 1.5 to about 5.5. Typically the sodium or potassium chloride is fed at a saturated or substantially saturated concentration containing from about 300 to about 325 grams per liter of sodium chloride or from about 450 to about 500 grams per liter of potassium chloride. The catholyte liquor recovered from the electrolytic cell can contain approximately 10 to 12 weight percent sodium hydroxide and 15 to 25 weight percent sodium chloride or approximately 15 to 20 weight percent potassium hydroxide and approximately 20 to 30 weight percent potassium chloride.

In an electrolytic cell for the production of hydrogen peroxide, typically the anolyte liquor is an aqueous solution containing about 15 to about 100 grams per liter of alkali metal hydroxide, e.g. sodium hydroxide. For comparison, the catholyte liquor recovered from a prior art electrolytic cell for the production of hydrogen peroxide can contain approximately 0.5 to 8 weight percent hydrogen peroxide and 15 to 200 grams per liter sodium hydroxide.

In an electrolytic cell for the production of chlorine and caustic, the anode of the electrochemical cell of the invention can be a dimensionally stable anode. In an electrolytic cell for the production of hydrogen peroxide, the anode can be stainless steel or nickel or a dimensionally stable anode. Th electrode frame component of the electrochemical cell of the invention can be of metal or plastic construction. Prior art cell frame construction has used heavy member construction and/or cylindrical shaped members. The electrode frame component of the cell of the invention can be composed of solid, as opposed to hollow or U or channel shaped frame members of metal or plastic which are resistant to exposure to chemicals with which the frame members come into contact under operating conditions of the bipolar electrolytic cell. The frame components of the bipolar electrolytic cell can also be formed of U or channel shaped members suitably formed so as to accommodate insertion of a reinforcing core material within the opening in the frame members.

The following examples illustrate the various aspects of the invention but are not intended to limit its scope. Where not otherwise specified throughout this specification and claims, temperatures are given in degrees centigrade and parts, percentages, and proportions are by weight.

EXAMPLE 1

An electrolytic cell was constructed with a dual purpose electrode generally in accordance with the schematic diagram shown in FIG. 1. The experimental cell had only one anolyte inlet and was constructed without a supporting plastic sheet 18 and no internal circulation of electrolyte was allowed to occur. The central current distributor of the electrode was made of a nickel sheet folded and welded at the top of the electrode and the anodes were dimensionally stable anodes sold by Electrode Corporation under the trade designation DSA ®. The sheet was also welded at the bottom through a nickel conductor bar. The cell diaphragm was a multiple layered microporous polypropylene film diaphragm sold under the trade desigation CELGARD 5511 having 3 layers of said film. The cathode electrical connection was threaded into the conductor bar and electrical connection was made to the cathode at the bottom of the cell. The anodes were electrically connected through the top of the cell. The porous, self-draining particles forming the gas diffusion electrode fill the opening formed by the plastic frame, the cell diaphragm, and the internally positioned current distributor. A nickel or plastic sump screen was positioned at the bottom of the cathode assembly to prevent the particles of the porous, self-draining electrode from falling out of the assembly. The cathode assembly, including the plastic frame and above referred to components were placed between two anodes in an electrolytic cell box.

The sodium hydroxide aqueous solution anolyte was circulated through the anolyte compartment by way of an anolyte inlet located at the base of the cell and an anolyte outlet located at the top of the cell. The anodic oxygen and spent electrolyte are removed from the top of the cell through the anolyte outlet. Electrolyte flow occurs through the diaphragm into the porous, self-draining gas diffusion electrode simultaneously with the flow of an oxygen-containing gas into the top of the cathode. The hydrogen peroxide product including excess oxygen gas flows out of the product outlet at the base of the cathode.

The experimental cell measured about 12 inches by 6 inches and was operated at about 0.23 amps per sqaure inch and about 1.6 volts with an electrolyte feed solution containing sodium hydroxide at a concentration of about 42 grams per liter. The cell was operated at about room temperature and produced a solution containing about 39 grams per liter of hydrogen peroxide. The cell operated at a current efficiency of about 92.3%. The flow rate of product was about 7 milliliters per minute.

EXAMPLE 2

A second electrolytic cell measuring 27 inches by 12 inches was constructed and operated with a dual purpose electrode generally in accordance with the schematic diagram shown in FIG. 1, but using internal electrolye circulation at only one of the anodes and only one inlet and outlet for anolyte external circulation. An expanded nickel mesh supported by a plastic core 18 was utilized as the current distributor instead of the nickel sheet utilized in the cell of Example 1. The cell diaphragm was 3 layers of CELGARD 5511 and the anodes were 304 stainless steel anodes. The cell operated with an anolyte concentration of about 1 molar sodium hydroxide at a temperature of about 20° centigrade. Oxygen gas was fed to the porous, self-draining cathode chip bed at a rate of about 2.4 liters per minute. A current density of about 0.37 amps per square inch was maintained. At an anloyte head of about 56 inches the product flow rate was about 62.5 milliliters per minute and the cell voltage was about 2.1 volts. The cell current efficiency for peroxide production was about 99% and the product concentration was about 40 grams per liter of hydrogen peroxide. Internal anolyte circulation at one anode occurred as the result of the upward movement of the gas produced at the anode during cell operation. The internal circlation flow rate was about 5 inches per second.

EXAMPLE 3

(Control, forming no part of this invention)

In order to demonstrate the effect of internal anolyte circulation in the same electrolytic cell of Example 2, the upward flow of the anolyte in the cell described in Example 2 was prevented by placing a solid barrier in the space between the cell wall and one side of the anode. The cell was operated at 250 amps under substantially the same conditions as in Example 2 but utilizing an anolyte head level of about 30 inches, a total upward flowing anolyte cross-sectional area of about 6 square inches and an anolyte feed rate of about 2.5 gallons per minute.

The flow velocity within the anolyte compartment measured two inches per second. This compares with the flow rate in a similar cell, as described in Example 2, of about five inches per second utilizing a 14 square inch cross sectional area (downcomer) between the cell wall and the anode in the cell. This data indicates that internal anolyte circulation improves the anolyte flow velocity $2\frac{1}{2}$ times over a similar Example 3 control cell in which internal anolyte circulation does not occur.

While this invention has been described with reference to certain specific embodiments, it will be recognized by those skilled in the art that many variations are possible without departing from the scope and spirit of the invention and it will be understood that it is intended to cover all changes and modifications of the invention shown herein for the purposes of illustration which do not constitute departures from the spirit and scope of the invention.

The embodiments of the invention in which an exclusive property or privilege is claimed are defined as follows:

1. A dual purpose electrode assembly for use in an electrochemical cell, said assembly consisting of
    (A) an electrode frame defining an opening, said opening filled with
    (B) a porous, self-draining, gas diffusion electrode containing an internally positioned current distributor and at least one external face and
    (C) a liquid permeable, microporous diaphragm contacting each external face of said electrode.

2. The electrode assembly of claim 1 wherein said gas diffusion electrode is a cathode and said diaphragm comprises plural layers of a microporous polypropylene film.

3. The elecrode assembly of claim 2 wherein said cathode comprises a bed of particles having pores formed between said particles of sufficient size and number to allow both gas and liquid to flow therethrough and said diaphragm comprises multiple layers of the same microporous polyproplyene film.

4. The electrode assembly of claim 2 wherein said particles comprise graphite particles and said diaphragm has 1 to about 6 variable layers or 2 to about 5 multiple layers.

5. The electrode assembly of claim 3 wherein said pores have a minimum diameter of about 30 to about 50 microns.

6. The electrode assembly of claim 5 wherein said current distributor is a metal mesh and said frame is a plastic.

7. The electrode assembly of claim 6 wherein said metal mesh current distributor is supported by a plastic sheet.

8. The electrode assembly of claim 7 wherein said metal mesh comprises nickel.

9. An electrochemical cell for the reaction of a liquid with a gas, said cell comprising at least one electrode characterized as porous and self-draining and at least two electrodes of opposite charge to said porous and self-draining electrode, each electrode of opposite charge contained in an electrolyte compartment and separated by an electrode assembly, consisting of
 (A) an electrode frame defining an opening, said opening filled with
 (B) a porous, self-draining, gas diffusion electrode containing an internally positioned current distributor and at least one external face and
 (C) a liquid permeable, microporous diaphragm contacting each external face of said electrode.

10. The cell of claim 9 wherein said porous, self-draining, gas diffusion electrode is a cathode and said diaphragm consists of plural layers of a microporous polypropylene film.

11. The cell of claim 10 wherein said cathode comprises a bed of particles having pores formed between said particles of sufficient size and number to allow both gas and liquid to flow therethrough.

12. The cell of claim 11 wherein said particles comprise graphite particles and said diaphragm has 1 to about 6 variable layers or 2 to about 5 multiple layers of the same said film.

13. The cell of claim 12 wherein said pores have a minimum diamaeter of about 30 to about 50 microns.

14. The cell of claim 13 wherein said current distributor is a metal mesh and said frame is a plastic.

15. The cell of claim 14 wherein said metal mesh current distributor is supported by a plastic sheet.

16. The cell of claim 15 wherein said metal mesh comprises nickel and said anodes comprise a metal sheet.

17. A process for reacting a liquid with a gas in an electrochemical cell comprising at least one electrode assembly comprising an electrode characterized as porous and self-draining and at least two electrodes of oppposite charge to said porous and self-draining electrode, each electrode of opposite charge contained in an electrolyte compartment and separated by said electrode assembly and further comprising: an electrode frame defining an opening, said opening filled with said porous, self-draining electrode and containing an internally positioned current distributor and a liquid permeable, microporous diaphragm contacting the external faces of said electrode, said process comprising
 (A) flowing a liquid electrolyte into said electrolyte compartment and recovering spent electrolyte from said electrolyte compartment and
 (B) providing internal electrolyte flow within said electrolyte compartment.

18. The process of claim 17 wherein said porous, self-draining, gas diffusion electrode is a cathode and said diaphragm comprises plural layers of a microporous polypropylene film and wherein said internal electrolyte flow within said electrolyte compartment is provided by the turbulence of electrolyte resulting from the release of gas at said electrodes of opposite charge.

* * * * *